United States Patent [19]
Bernstein

[11] Patent Number: 4,602,923
[45] Date of Patent: Jul. 29, 1986

[54] APPARATUS FOR DEGASIFYING A LIQUID MEDIUM

[75] Inventor: Hans F. Bernstein, Herrsching, Fed. Rep. of Germany

[73] Assignee: Erwin J. Baumgartler, Brooklyn, N.Y.

[21] Appl. No.: 596,443

[22] Filed: Apr. 3, 1984

[51] Int. Cl.[4] ............................................. B81D 19/00
[52] U.S. Cl. ......................................... 55/165; 55/55; 55/189; 55/21
[58] Field of Search ................. 55/21, 38, 40, 55, 160, 55/165, 168, 189; 210/188

[56] References Cited

U.S. PATENT DOCUMENTS

| | | | |
|---|---|---|---|
| 2,652,129 | 9/1953 | Benedict | 55/55 |
| 2,809,711 | 10/1957 | Allen | 55/165 |
| 2,815,765 | 12/1957 | Adelson | 55/165 X |
| 3,073,091 | 1/1963 | Kalish | 55/189 X |
| 3,357,161 | 12/1967 | Starr et al. | 55/189 |
| 3,460,319 | 8/1969 | Tkach | 55/55 X |
| 4,268,280 | 5/1981 | Fujii et al. | 55/55 X |
| 4,287,941 | 9/1981 | Allen | 55/189 X |
| 4,298,356 | 11/1981 | Pernic | 55/165 |
| 4,385,909 | 5/1983 | Starr | 55/55 |

Primary Examiner—Charles Hart
Attorney, Agent, or Firm—Steinberg & Raskin

[57] ABSTRACT

An apparatus for degasifying a liquid medium. The apparatus comprises a chamber in which gas is removed from the liquid medium, means for conveying the liquid medium into this chamber, means for conveying the liquid medium out of the chamber, and means for reducing pressure within the chamber to separate the gas from the liquid medium. The method comprises the steps of conveying liquid medium into the chamber, reducing pressure within the chamber to separate gas from the liquid medium, and then conveying the degasified liquid medium out of the chamber.

9 Claims, 8 Drawing Figures

APPARATUS FOR DEGASIFYING A LIQUID MEDIUM

BACKGROUND OF THE INVENTION

The invention is directed to an apparatus for degasifying a liquid, such as a flowing liquid medium. The invention is particularly directed to an apparatus for the deaeration of a flowing liquid medium such as water in a heat exchange cycle, e.g. forming a part of a heating system.

Hydraulic systems, particularly heating systems based upon heat exchange involving a flowing liquid medium, can never be entirely filled without eliminating the occurence of gaseous bubbles such as air bubbles within the liquid medium itself (e.g. water). Additionally, unwanted gas such as air or oxygen can enter such systems through leaks (e.g. in plastic pipes of a floor-type heating system) and through diffusion into the liquid medium. The gas such as air or oxygen entering a pipe carrying the liquid medium causes noise, corrosion of heating components such as the interior of the heating pipe itself, and reduced the overall effectiveness of a heating system or operation in which these pipes are disposed. Such problems have been conventionally overcome by continuously venting the heating system with suitably-placed escape valves. However, such continuous venting of a heating system is extremely time-consuming, cumbersome and inconvenient, and also inadequate for eliminating gaseous bubbles such as air from the flowing liquid medium (i.e. inadequate for accomplishing the degasification of the flowing liquid medium).

Automatic-type escape valves have been utilized to degasify the flowing liquid medium in such heating systems, these automatic escape valves being connected with the pipes carrying the heating liquid medium, and designed to vent air that has penetrated into the flowing liquid medium, via a float valve. However, it has been proven that such automatic-type escape valves are almost totally useless, since air being carried along within a cycling liquid medium such as water, will not at all enter the pipe provided in a separator of the escape valve, and thus the air so entrained in the flowing water medium will not escape therefrom through the valve.

In order to solve this particular problem, an absorption-degassing process distributed under the trademark "SPIROVENT" has been proposed. With the equipment of this process, the entire heating liquid medium flows across a degasifying container. The degassing container is provided with means for generating a laminar flow of the liquid medium, to enable gas or air bubbles to rise quite easily to the surface thereof. The apparatus of this "SPIROVENT" process is attached just after the heating boiler, i.e., at the point where the flowing water medium has its greatest temperature, so the flowing water will only have a slight susceptibility to reentraining gas such as air released during the overall flow process. Rising gas bubbles accumulate in an area of this apparatus which can be brought into contact with the atmosphere, by means of a float valve when the liquid level of the flowing water is lowered, to enable the gas such as air to escape when there is sufficient accumulation of the same.

Such a device as disclosed in this "SPIROVENT" process, was expected to eliminate gas or air bubbles from the water flowing in the heating cycle, by loading the flowing water cycle with liquid medium that has not been saturated with the gas or air, so that the air or gas trapped within the flowing, heating water cycle in the heating pipe, can be absorbed into the loaded medium to a point of saturation. The apparatus of the "SPIROVENT" process is located right after the boiler in the heating cycle, because it has been assumed that much less gas can be released from the flowing liquid or water medium at the temperature where the liquid has just exited from the heat exchanger. However, on the one hand, greater quantities of air will still tend to exist at other points in the flowing liquid cycle, for example in the circulating pump. On the other hand, the difference in solubility corresponding to the small difference existing between the return temperature of the liquid heating medium just after a heat exchanger and the flow temperature where the "SPIROVENT" apparatus is located, is extremely small, so that effective absorption of gas or air bubbles into the flowing liquid medium within a heating cycle, cannot be expected with the process and apparatus of "SPIROVENT".

SUMMARY OF THE INVENTION

Accordingly, it is an object of the present invention to provide a new and improved apparatus for degasifying a flowing liquid medium, such as a heating medium in a heat exchange cycle, which is able to effectively degasify the flowing liquid medium (i.e. eliminate gas or air bubbles entrained in the flowing liquid medium).

It is also an object of the present invention to provide a new and improved apparatus for degasifying a flowing liquid medium, which will successfully degasify the same irrespective of the temperature of the liquid medium at any point along its flow.

It is an additional object of the present invention to provide a new and improved apparatus for degasifying a liquid medium, which can successfully degasify the same with a minimum consumption of energy.

It is another object of the present invention to provide a new and improved apparatus for degasifying a liquid medium, in which the liquid medium can be smoothly and reliably degasified, with little or no interruptions in the flow thereof.

It is still another object of the present invention to provide a new and improved apparatus for degasifying a liquid medium, in which such degasification can be reliably controlled from a remote location.

It is a further object of the present invention to provide a new and improved apparatus for degasifying a liquid medium, in which degasification can be accomplished based on measurement of pressure within the flowing medium.

It is a still further object of the present invention to provide a new and improved apparatus for degasifying a liquid medium, in which such degasification can be accomplished at discrete, timed intervals.

It is even another object of the present invention to provide a new and improved apparatus for degasifying a liquid medium, in which such degasification can be carried out as a function of the pressure within the liquid medium.

It is even a further object of the present invention to provide a new and improved apparatus for degasifying a liquid medium, in which such degasification can be carried out on a continuous basis, or on an interrupted basis at discrete intervals.

It is still even another object of the present invention to provide a new and improved apparatus for degasifying a liquid medium, in which degasification can be accomplished by altering the pressure of a flowing liquid medium at discrete time intervals and/or discrete locations along the flow thereof.

These and other objects are attained by the present invention which provides an apparatus for degasifying a liquid medium, comprising
  a chamber in which gas is removed from the liquid medium,
  means for conveying the liquid medium into the chamber,
  means for conveying the liquid medium out of the chamber, and
  means for reducing pressure within the chamber to separate the gas from the liquid medium.

The apparatus of the present invention also comprises means for removing the separated gas from the chamber, which comprises an outlet conduit connected with the chamber to direct the gas so removed out of the chamber. The means for conveying the liquid medium into the chamber is connected with an external source of the liquid medium such as a flowing heating cycle, and also constitutes means for intermittently conveying the liquid medium from the external source to the chamber. The pressure reducing means also constitutes means for intermittently reducing pressure in the chamber to a level below the pressure in the external source of the liquid medium, such as the heating cycle, so that gas entrained within the liquid medium can be successfully separated within the chamber and directed out through the outlet conduit.

The present invention also provides a method for degasifying a liquid medium, comprising the steps of
  conveying the liquid medium into a chamber,
  reducing pressure within the chamber to separate gas from the liquid medium, and
  conveying the degasified liquid medium out of the chamber.
The method additonally comprises the step of conveying the gas separated from the liquid medium out of the chamber.

The method and apparatus of the present invention are especially useful for deaeration of liquid medium such as water flowing within heat exchange cycles. In the apparatus of the present invention, the means for conveying liquid medium into the chamber may comprise a conduit connected with an external source of the liquid medium, such as a flowing liquid medium in a heating cycle, such that an interior of the chamber is at least periodically connected with the circulation of liquid medium so that some of the liquid enters into the chamber to be degasified. Additionally, the pressure reducing means may operate on an intermittent basis (i.e. only when liquid is introduced into the chamber to be degasified), or such means may operate on a continuous basis, continuously degasifying liquid that continuously flows into the requisite chamber for degasification. In this regard, the apparatus of the present invention may be connected with a circulating system of liquid medium at any locations along the circulation thereof (please see FIGS. 1 and 6 infra). Alternatively, the apparatus itself may be directly disposed within the circulating channel of the liquid medium, so that all liquid flowing in such a circulating path will pass through the apparatus of the present invention, and be degasified by the same. The means for reducing pressure within the chamber may also constitute means for lowering the pressure within the chamber to a point below the pressure of the liquid medium within the external source, such as within the circulating flow, so that gas or air bubbles entrained within the liquid contained within the chamber will rise to the surface thereof, and separate out from the liquid, which is thus successfully degasified.

BRIEF DESCRIPTION OF THE DRAWINGS

The objects noted above, and other objects, will become apparent from the following description of the present invention in detail, with reference to specific embodiments illustrated in the accompanying drawings. The specific embodiments of the present invention illustrated in the drawings are merely exemplary, and are not intended to limit the scope of the present invention in any way, but are merely intended to provide a better understanding of the present invention. In the drawings.

DETAILED DESCRIPTION OF PREFERRED EMBODIMENTS

Figure 1:
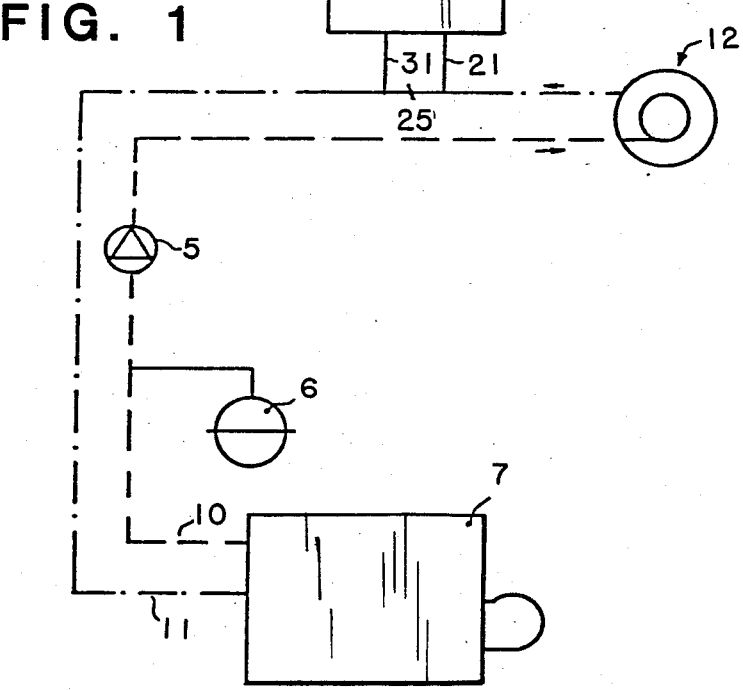
FIG. 1 illustrates a heating cycle incorporating the apparatus and method of the present invention.

Referring to the figures, the heating system or cycle illustrated in FIG. 1 is equipped with a boiler 7 having a burner, from which a liquid medium such as heated water is supplied to the heating system 12 through flow pipe 10 and circulating pump 5 disposed in the flow pipe 10. The heating water returns in return pipe 11 from the heating system or exchanger 12 to the boiler 7. A conventional pressure expansion vessel 6 is attached to the flow pipe 10.

A degasification chamber or container 1 of the present invention is inserted or disposed in the heating cycle, so that at least a portion of the flowing liquid medium also flows into the degasification container 1 through inlet pipe 21. This liquid medium flows out from the degasification container 1 through discharge line 31 and back into return flow conduit 11 as illustrated in FIG. 1. The apparatus of the present invention, including the degasification container 1 and inlet and discharge conduits 21/31, can be fitted into the heating cycle at any desired location along the system, since the present invention principly operates irrespective of the particular temperature of the flowing liquid medium in the heating cycle.

Figure 2:
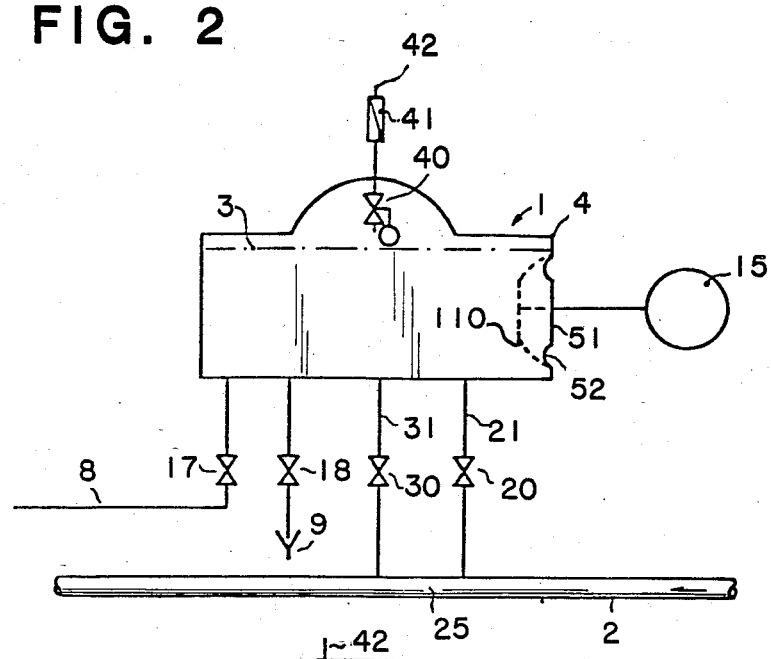
FIG. 2 illustrates an embodiment of the present invention which may be incorporated into the heating cycle of FIG. 1.

FIG. 2 illustrates a particular embodiment of the apparatus of the present invention in greater detail. This embodiment of the present invention, as illustrated in FIG. 2, comprise degasification chamber on container 1 provided with an enclosure or container wall 4. The apparatus of the present invention comprises means for conveying liquid medium into the chamber or container 1. This means comprises an inlet conduit or pipe 21 connecting the chamber 1 with a circulating pipe 2 forming part of the heating cycle. Additionally, the present invention comprises means for conveying liquid medium out of the chamber or container 1, this means comprising a discharge line or conduit 31 connecting the chamber 1 with the circulating pipe 2, as illustrated in FIG. 2 also. An intake valve 20 is disposed in the inlet pipe 21, while a discharge valve 30 is disposed in the discharge line 31.

Circulating pipe 2 is provide with a choke 25 at a location between the points of connection with the respective inlet and discharge lines 21/31, so that at least a portion of the flow of the liquid medium in the heating cycle can be conducted to the degasification container 1. Additionally, the degasification container 1 is equipped with a feed pipe or conduit 8 having an admission valve 17 as illustrated for introducing liquid medium into the container 1, and ultimately into the heating cycle. Degasification container 1 is also equipped with a discharge line 9, having a discharge valve 18 as illustrated in FIG. 2, which is used to discharge liquid out of the degasification container 1, and also out of the heating cycle system accordingly.

A degasification piston 51 is sealingly disposed at one location within the container wall 4, through a flexible sealing membrane 52. The degasification piston 51 is connected with drive means constituted by driving elements 15, so that the degasification piston 51 can either be inserted into the container 1 (please see dotted line 110 in FIG. 2), or removed from the container 1. The movement of the degasification piston 51 into and out of container 1 creates a respective decrease or increase of the container volume, and concomitant increase or decrease of pressure within the container volume. An exhaust gas conduit 42 is connected with the container 1 as illustrated in FIG. 2, and is provided with an exhaust gas valve 40 which is disposed to be closed by a float at high liquid levels within the container 1. Also, a non-return gas valve 41 is disposed within the exhaust gas conduit 42 as illustrated, to allow outflow of gas separated from the liquid medium from the container 1, but to prevent any inflow of air or backflow of exhaust gas into the degasification container 1.

The present invention as illustrated in FIG. 2 operates as follows. In order to fill the operating heating cycle itself, initially the admission valve 17 disposed in feed line 8 is open, with the discharge valve 18 being closed, while the respective intake and discharge valves 21 and 31 are open, along with the choke 25 being closed. Thus, the apparatus of the present invention, i.e. degasification container 1, is disposed to be situated directly along the line of a heating cycle, with all liquid medium passing through the apparatus, i.e. through container 1 thereof. Due to the fact that all liquid medium being introduced, for example fresh water being fed through line 8, flows into the interior of the degasification container 1 through inlet pipe 21 with a relatively low flow rate, gas bubbles in the fresh water will rise to the surface. When the water level 3 in the degasification container is relatively low, the gas exhaust valve 40 is opened, such exhaust valve 40 adapted to be closed by a float when liquid level 3 reaches the dashdot line indicated in FIG. 2, so that the gas or air released from the flowing liquid medium is discharged through the gas exhaust line 42 via the non-return valve 41 so it cannot flow back into the heating system. When the liquid level 3 increases due to the fresh water supply gradually increasing in the heating system, and thus filling up container 1 as it flows therethrough (choke 25 is closed), the gas exhaust valve 40 will close until sufficient gas or air as released from the liquid medium has accumulated in the degasification chamber 1. Thus by this initial procedure, a significant portion of the gas bubbles entrained in the liquid medium flow in the heating cycle, can be removed by simple pressure reduction within the vessel or container 1, by opening the exhaust valve 40, without having to carry out an affirmative degasification operation with the piston 51.

This initial operation results in the advantage in that already during the process of filling the heating cycle with fresh water, the degasification container 1 can, from time to time, be subjected to a vacuum or a pressure reduction therein (e.g. by opening the exhaust valve 40 or by affirmative action of degasification piston 51 if desired), so that, on the one hand, gas bubbles entrained in the flowing liquid medium will rise faster due to expansion and enlargement of respective diameters of the bubbles due to pressure reduction, so that gas dissolves in the flowing liquid medium such as water will escape therefrom and rise up in the container 1. This operation is described in more detail infra.

While the heating system or cycle is being filled with fresh water from feed pipe 8, the interior of the degasification chamber 1 may also, from time to time, be subjected to normal pressure through opening of the discharge valve 18 in discharge line 9, so that the quantity of gas or air dissolved in this fresh water, subject to the pressure in the fresh water pipe 8, is reduced to the quantity of gas which can be dissolved in water under normal, atmospheric pressure. Additionally, after the degasification container 1 has been filled, admission valve 17 and respective intake and discharge valves 20/30 are closed, while the discharge valve 18 is then opened, with the piston 51 being in retracted postion out of the interior volume of the container 1. As soon as the pressure within container 1 returns to a normal, atmospheric level, discharge valve 18 is closed again, with the gas bubbles in the liquid medium contained within container 1 rising. Subsequently, discharge valve 30 is opened, and driving element 15 of piston 51 is actuated so that the piston 51 is extended or pushed into the interior volume of container 1. Thus, the gas separated from the liquid medium within container 1 escapes through the exhaust gas conduit 42, while a portion of the liquid medium disposed within container 1 is pushed through the discharge valve 20 and through the discharge conduit 31 into the circulating conduit 2, by action of the piston 51 extending into the interior volume of container 1, and decreasing the same. This operation is repeated as necessary, until the heating system is filled with liquid medium to the desired amount.

The gas separation from the liquid medium may also take place as follows, when the heating cycle is being put into operation. The damper 25 in the circulating pipe 2 of the heating cycle is at least partially closed, while intake/discharge valves 20/30 are opened, and the liquid medium is allowed to flow into container 1 from feed line 8, and into and around the heating cycle (the circulating pump 5 is turned on, to facilitate this circulation of the liquid medium being introduced).

During this flow operation, valve 18 of discharge line 9 is opened, so that the pressure within the container 1 drops. This drop is pressure within the interior volume of container 1, also causes the degasification of the liquid medium being introduced into the heating cycle, as noted supra. The quantity of liquid medium lost from the heating system by passing out through discharge line 9 when discharge valve 18 is opened, must naturally be replaced by introducing more liquid medium through the feed pipe 8.

As soon as the heating system is completely filled, admission and discharge valves 17/18 will remain closed, with only the intake/discharge valves 20/30 disposed in respective inlet and discharge lines 21/31 being opened. Continuous degasification of the liquid medium during operation of the heating cycle, proceeds in the following manner. When piston 51 is extended into the container 1, the inlet valve 20 is opened so that liquid medium flows into the degasification container 1, and air or gas contained within the degasification container 1 escapes through the exhaust gas conduit 42, until the float valve 40 closes by the liquid medium reaching the dash-dot level 3 illustrated in FIG. 2. Then, the valves 20/30 are again closed, with the driving elements 15 actuated so that the piston 51 is extended outwardly from the degasification container 1. This will create a vacuum or pressure reduction within the degasification container 1, so that gas dissolved within the liquid medium contained within the container 1 will escape from the liquid medium. The gas bubbles carried in this liquid medium quickly rise to the surface due to the pressure reduction or vacuum within the interior of container 1, since the volume of container 1 has been expanded by the piston 51 retracting out of the container.

After a suitable interval of time for example, the intake valve 20 in the intake conduit 21 is again opened, so that liquid medium contained in the heating cycle or system may again flow into the container 1. When this happens, the gas separated out from the liquid already disposed within the container 1, will be forced out through the gas exhaust conduit 42 by the level of liquid within container 1 increasing, until the float valve 40 is again closed by the liquid level reaching the dash-dot line illustrated in FIG. 2 (when the pressure is initially reduced by the piston 51 retracting outwardly, the level of liquid within the container 1 is naturally decreased).

After the exhaust gas conduit 42 has been closed by the float valve 40 again, the intake valve 20 disposed in intake line 21 is again closed, while the discharge valve 30 disposed in discharge line 31 is opened. The driving elements 15 are then actuated to extend piston 51 into the degasification container 1, decreasing the volume of the same, so that at least a portion of the liquid medium that has been degasified within the container 1 is returned to the heating cycle through the discharge line 31 and opened discharge valve 30, back into the circulating pipe 2.

This particular degasification operation can be accomplished with three different positions of piston 51 within the degasification chamber. For example, the container 1 can be initially filled with circulating liquid medium passing through open valve 20 and inlet conduit 21, with the piston 51 disposed in a substantially central position, e.g. midway between its completely extended and completely retracted positions. Then, after the intake valve 20 has been closed, the piston 51 can be pulled out of the container 1 to its completely retracted position, thus creating a vacuum or pressure reduction within the container 1. This causes the gas entrained within the liquid medium disposed in container 1 to separate out from the liquid medium and rise up in the container. Then, this escaped gas can be forced out of the container 1 entirely, through the exhaust gas conduit 42, by pushing piston 51 back down to its center position. Afterwards, the discharge valve 30 disposed in discharge line 31 can then be reopened, with the piston 51 being completely extended into the container 1, to force at least a portion of the degasified liquid medium disposed within container 1, back into the heating cycle.

Intake and discharge valves 20 and 30, along with drive elements 15 for piston 51, may be operated through a time sequence control, not described in further detail. However, it is also possible to operate a pressure-dependent automatic control (i.e., control based on the influence of temperature within the flowing liquid medium), such as described infra with another embodiment of the present invention. The embodiment of the present invention illustrated in FIG. 2 is both suitable for use in a stationary heating cycle, or for use in a moble type of operation, in which an apparatus of the present invention for filling of a heating cycle and deaeration thereof, is only temporarily attached to a fixed heating system, and is then detached therefrom, and reattached only as needed.

Figure 3:
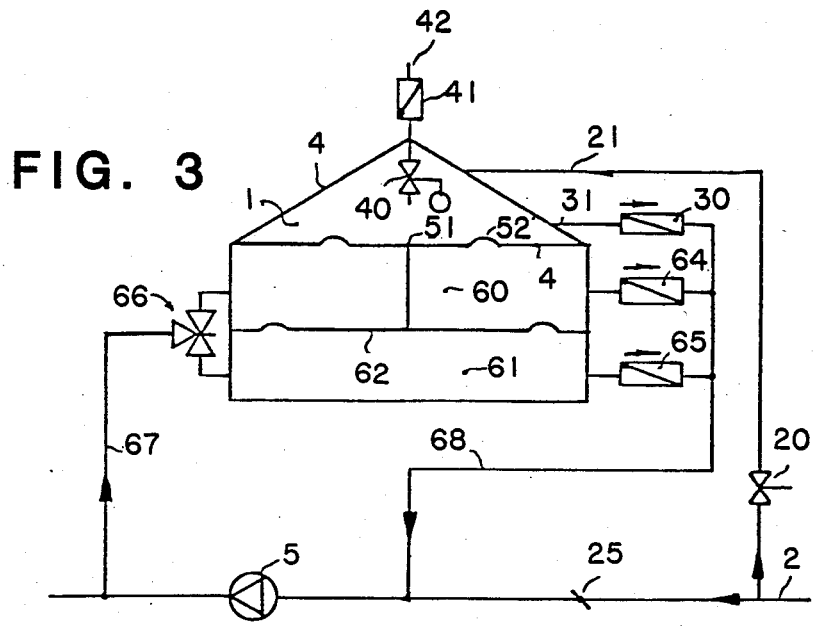
FIG. 3 illustates another embodiment of the present invention, provided with hydraulic drive means for the operation thereof.

The embodiment of the present invention illustrated in FIG. 3 concerns the particular kind of driving means for driving elements utilized for actuation of piston 51. The operation of the piston 51 in the embodiment of FIG. 3 is essentially the same as the operation described with respect to the embodiment illustrated in FIG. 2. Fresh water pipeline 8 and discharge line 9, also forming a part of the embodiment illustrated in FIG. 3, are not illustrated in this particular figure, for the sake of clarity.

In the embodiment of the present invention illustrated in FIG. 3, the drive means or driving elements are formed by two adjacent chambers 60/61, separated from each other by a piston 62 sealed with a membrane. The piston 62 is affixed to the piston 51 of the degasification container 1, while the chambers 60 and 61 are each connected with a discharge line 68 through respective non-return valves 64 and 65. Thus the pressure fluid medium used for actuating the piston 51, may also constitute part of the liquid medium flowing through the heating cycle, with the particular pressure fluid medium being returned to the circulating pipe 2 from the chambers 60/61. Additionally, the pressure chambers 60/61 are connected to a feed line 67 through a three-way control valve 66, feed line 67 in turn being connected with the circulating pipe 2. The three-way control valve 66 allows pressure fluid medium (in this case part of the liquid medium flowing in circulating pipe 2) passing up through line 67, to flow into either chamber 60 or into chamber 61, or even into both chambers at once if so desired.

A pump 5 is disposed within the circulating pipe 2 forming a part of the heating cycle, between the points where the feed pipe 67 and the discharge pipe 68 connect with circulating line 2, as illustrated in FIG. 3. This pump 5 may also constitute a circulating pump, for circulating the liquid medium around the heating cycle as illustrated in FIG. 1, for example. The choke valve 25, which may be disposed at a relatively great distance away from the points where discharge line 68 and feed line 67 join with the circulating pipe 2, may be gradually closed, or even closed entirely to generate a proper pressure differential between the discharge line 68 and the feed line 67.

In the actuation of the pistons 62/51 in the embodiment illustrated in FIG. 3, the three-way control valve is intially activated to connect chamber 60 with feed line 67 (and to close off chamber 61 from feed line 67), so that chamber 60 fills with pressure fluid (i.e. liquid medium flowing up into line 67 from circulating line 2), so that piston 51 is retracted out of the degasification container 1, and at least a portion of the liquid medium already contained in chamber 61 flows through the respective non-return valve 65 and into the discharge line 68, then back into the circulating pipe 2. All such liquid medium contained within pressure chamber 61 may be ejected therefrom, under continued actuation of pistons 62/51 into the retracted position out of degasification chamber 1.

If the three-way control valve 66 is then reactivated to connect chamber 61 with feed line 67, and close off chamber 60, then the pistons 62/51 are extended in the opposite direction, with the piston 51 being pushed into the degasification container 1, with the excess volume of liquid medium within chamber 60 then being forced out through non-return valve 64, into discharge line 68, and ultimately back into circulating pipe 2 (all such liquid medium within the pressure chamber 60 may naturally be expelled therefrom).

The overall degasification process, along with the control of intake valve 20 disposed in inlet pipe 21 in the embodiment of FIG. 3, takes place by the same principles as in the embodiment illustrated in FIG. 2. Due to the specific type of driving elements described with respect to the embodiment illustrated in FIG. 3, it is now possible to equip a heating system or cycle, which normally requires a low power pump (i.e. a low pressure pump at required output), with just a circulating pump such as pump 5 illustrated in FIG. 3, which has a correspondingly higher power than conventional low power pumps, without any need of having to attach motor-operated driving elements. The intake and three-way control valves 20 and 66, can be controlled through a time sequence control as noted above with respect to the valves in the embodiment of FIG. 2, or through a pressure/temperature control as described infra, with respect to other embodiments.

Figure 4:
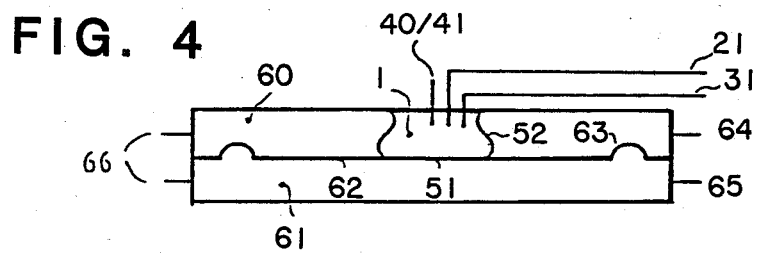
FIG. 4 illustrates another embodiment of the present invention, similar to the embodiment illustrated in FIG. 3.

FIG. 4 illustrates an embodiment of the present invention similar to the embodiment illustrated in FIG. 3, with the piston means being formed differently from the embodiment illustrated in FIG. 3. In the embodiment illustrated in FIG. 4, the piston means is formed as a piston plate, acting at its center as a piston 51, and acting at its circular edge as a drive element 62. A single such piston plate is affixed in an enclosure via the sealing membrane 63, thus forming two respective chambers 60/61 as in the embodiment illustrated in FIG. 3. The center of the piston plate, forming the piston 51, is sealed off against the cover of the enclosure by a circular membrane 52, and thus encloses the degasification container 1 as illustrated in FIG. 4. Feed and discharge lines 67 and 68 are connected with respective chambers 60 and 61 through the three-way control valve 66 and respective non-return valves 64 and 65 as in the embodiment illustrated in FIG. 3. Moreover, the embodiment illustrated in FIG. 4 may also be constructed in the form of ball sockets, thus resulting in reinforcement of the piston plates 51 and 62.

Figure 5:
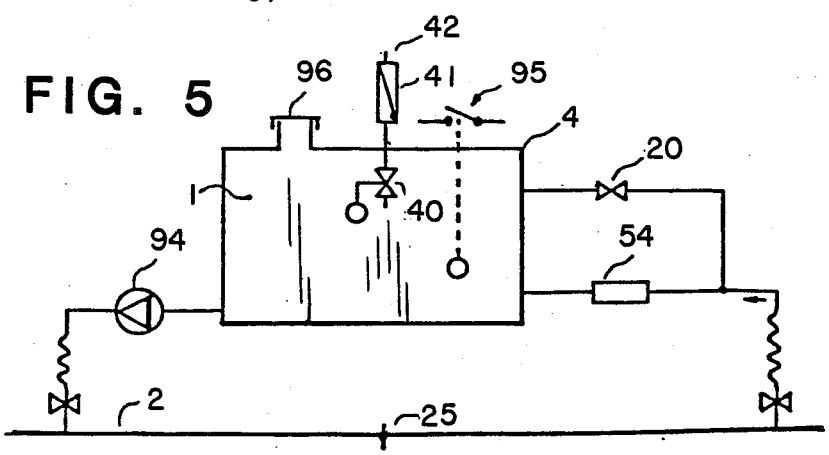
FIG. 5 illustrates another embodiment of the present invention, especially suitable for continuous operation and for mobile application.

The embodiments of the present invention illustrated in FIG. 5 concerns a movable system for degasifying liquid medium in a heating cycle, that is equipped with a degasification container 1 which is connected with the circulating pipe 2 through a powerful pump 94. Degasification container 1 is equipped with a tightly-sealable brine filler neck 96, with the gas exhaust conduit 42 and respective float-controlled exhaust valve 40 and non-return valve 41 being disposed as described above with respect to the other embodiments of the present invention.

Additionally, the embodiment illustrated in FIG. 5 also comprises a switch 95 that is controlled by water level within the degasification container 1 (i.e. a float-controlled switch). The degasification container 1 is completely connected with a circulating system of liquid medium as illustrated in FIG. 5, with the return section of the circulating pipe 2 being connected with the container 1 through both a pressure reducing valve 54 and the intake valve 20 disposed in parallel with respect to one another, as illustrated in FIG. 5.

The embodiment of the present invention illustrated in FIG. 5 operates in the following manner. When the empty degasification container 1 is initially connected to the heating system already filled with circulating liquid medium, the level-controlled switch 95 is closed. The intake valve 20 and the pump 94 are so connected with the switch 95 that, when a low liquid medium level is disposed within degasification container 1, the intake valve 20 is opened and the pump 94 is not in operation. As long as the degasification container 1 remains empty, or remains unfilled above a certain level, the liquid medium will flow through the intake valve 20 and into the degasification container 1, until the liquid level reaches the certain point where the switch 95 will be closed.

The closing of switch 95 also closes the intake valve 20, and actuates the powerful pump 94 into operation. This pump creates a vacuum within the degasification container 1, so that water can then be drawn into the degasification container 1 through the pressure reduction valve 54 illustrated in FIG. 5. At this point, the pressure reduction valve 54 is so adjusted that it only opens when there is a vacuum within the container 1 (or a pressure reduction therein relative to atmospheric pressure).

While the pump 94 operates, the liquid medium flowing through the pressure reduction valve is continuously degasified. The liquid level disposed within container 1 is also slowly reduced, by the vacuum or pressure reduction being applied therein (the constant vacuum or pressure reduction applied to the interior of container 1 will naturally reduce the liquid level therein). As soon as the liquid medium is reduced within container 1 to such a level that switch 95 opens again, the pump 94 is switched off and the intake valve 20 is again opened. Then the liquid medium will again flow from the circulating pipe 2 up into the degasification container 1 through the intake valve 20, and will displace or push the gas separated out from the liquid already degasified within the container 1, up into and out through the gas exhaust conduit 42 through float valve 40 and non-return valve 41. Thus as soon as the switch 95 is reopened, the degasification operation is repeated all over again.

Switch 95 is naturally equipped with a large hysteresis, so that degasification can proceed over an extended period of time. The embodiment illustrated in FIG. 5 may be affixed into a heating cycle, or it may be temporarily disposed in connection with such a heating cycle. Moreover, all of the liquid medium flowing in such a heating cycle may be caused to pass through the embodiment of the invention illustrated in FIG. 5, or optionally, only a part of such liquid medium need be forced into the container 1 for degasification (depending on adjustment of choke 25 in circulating pipe 2).

In all of the embodiments of the present invention described in FIGS. 1-5 thus far, the interior of the degasification container 1 is preferably designed so that the gas bubbles which are entrained within the liquid medium travel the shortest possible distance to the surface of the medium in order to be separated therefrom (such surface of the liquid medium should also be as "short" as possible). Such a degasification container which achieves this effect, may be designed as a labyrinth situated in a flat trough, and connected with the inflows and discharge of the liquid medium to be degasified, as noted above. Advantageously, several such labyrinths of this type are connected in series or arranged on top of one another, in a degasification container 1 of the present invention. In order to shorten the route gas bubbles must travel to escape from the liquid medium being degasified, and to enlarge the surface of the liquid medium so that more such gas can escape therefrom, it is advantageous to inject the liquid medium to be degasified into the container 1 under vaccum by atomization, or to provide a spray cascade for introducing the liquid medium into the container 1. Wire baffles or suitably-arranged discs and strainers may be appropriately incorporated into the container 1, in order to minimize any occurrence of froth as a liquid medium is injected into the degasification container 1.

Figure 7:
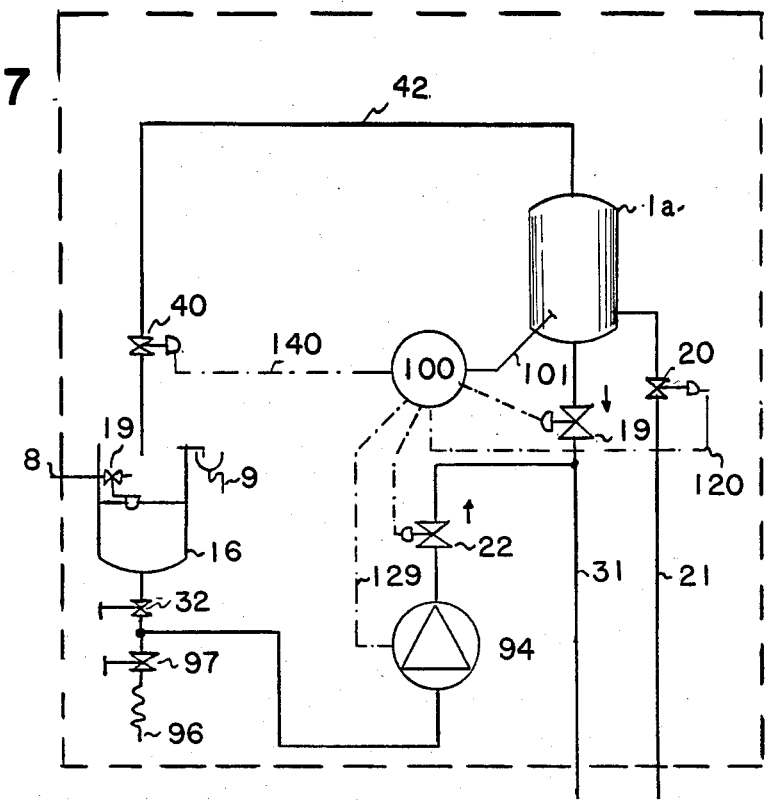
FIG. 7 illustrates another embodiment of the present invention.
Figure 8:
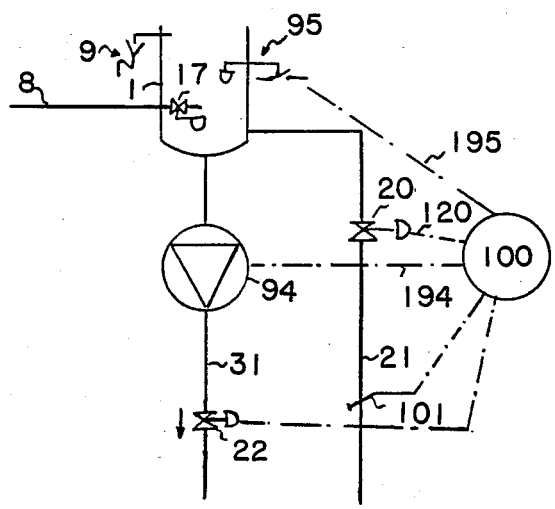
FIG. 8 illustrates a further embodiment of the present invention, similar to the embodiment illustrated in FIG. 7.

In other embodiments of the present invention illustrated in FIG. 7 and 8, the degasification container 1 or 1a is connected through a feed line 21 to the pipe 2, as illustrated in these figures. A remotely-adjustable valve 20 is provided in the feed line 21, this valve being disposed to permit or stop flow of liquid medium from the pipe 2 into the respective degasification container 1 or 1a. The pressure within the respective degasification container 1 or 1a in the embodiments illustrated in FIGS. 7 and 8, is at least temporarily lowered by bringing the interior of the respective degasification container into contact with the atmosphere.

The embodiment of the present invention illustrated in FIG. 8 will be described infra, along with the description of the operation thereof. In the embodiment illustrated in FIG. 8, feed line 21 which is connected with the pipe 2 (not illustrated) through a T-joint, is connected through the valve 20 to the degasification container 1 which is essentially open to the atmosphere as illustrated. The valve 20 is connected with a control 100, via a control line 120, the control 100 preferably being an electronic device. A pressure pump 94 is preferably disposed adjacent the lowest point of the degasification container 1 within the discharge line 31 as illustrated, this line 31 running back into the circulating pipe 2 (not illustrated) also through a T-joint. Discharge line 31 is connected to the intake side of the pressure pump 94 as illustrated in FIG. 8. Thus the pressure pump 94 is connected at the outlet side of the degasification container 1 in the embodiment of FIG. 8.

A pipe 8 for feeding fresh water also extends into the degasification container 1 as illustrated, this fresh water pipe 8 being opened by a float-control valve 17 when the liquid level in the degasification container 1 drops below a certain minimum level. Furthermore, the degasification container 1 is provided with an overflow 9, which is so disposed and dimensioned that even if the float-control valve 17 jams in an open position, fresh water can be safely discharged from the degasification container 1 without backing up into any of the other lines.

Degasification container 1 is also equipped with a level alarm 95 (illustrated here as a float-control switch), which indicates the actual level of liquid medium within the degasification container 1 to the control 100 through the control line 195. The control 100 also controls the pressure pump 94 through the control line 194. Additionally, a pressure sensor 101 is so disposed in the piping system, that the pressure sensor 101 is able to measure the pressure in the system independently of the operating condition of the remotely-adjustable intake valve 20. The electronic control device 100 has several different types of program memories, for example PROM or EPROM, as well as being equipped with a timer.

Figure 6:
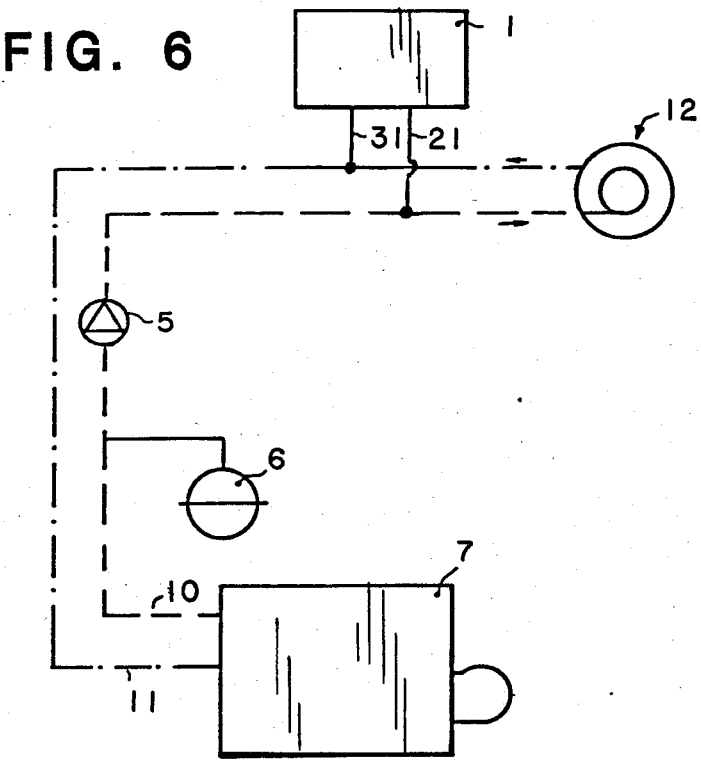
FIG. 6 illustrates a heating cycle similar to the cycle illustrated in FIG. 1, with which the present invention is connected at different locations than in FIG. 1.

FIG. 6 illustrates an alternative arrangement of the apparatus of the present invention with respect to a heating cycle, as opposed to the arrangement illustrated in FIG. 1. As illustrated in FIG. 6, the intake line 21 of the apparatus of the present invention preferably contacts the heating cycle shortly after the pressure connection of the circulating pump 5 (i.e. before the heat exchanger 12), with the discharge pipe 31 connecting with the section of the circulation pipe 2 of the heating cycle emerging from the heat exchanger 12. Any of the embodiments of the present invention illustrated herein, may be connected with a heating cycle in either the fashion illustrated in FIG. 1 or in the manner illustrated in FIG. 6. The liquid medium flowing in such a heating cycle may thus be degasified independently of the particular temperature of the medium at any location therein.

The operation of the embodiment of the present invention illustrated in FIG. 8 will now be described. During the initial loading of the heating system (i.e. the initial introduction of fresh water into the system for example), control 100 switches to its first program which opens the intake valve 20 as long as the level of liquid medium within the degasification container 1 does not exceed a maximum level. Moreover, the pressure pump 94 is actuated as long as the liquid within the degasification container 1 is below a minimum level. Initially, in the start-up of the system, the degasification container 1 is empty, and the float valve 17 is opened so that fresh water flows from the pipe 8 into the degasification container 1, whereupon the fresh water is fed into the heating cycle or system through the discharge line 21 and by actuation of pump 94, and also through valve 22 which is opened at this point of the operation.

This process continues until so much liquid medium or water flows out of pipe 21 and back into degasification chamber 1, that the quantity of water flowing out of intake pipe 21 together with the fresh water being introduced through pipe 8, exceeds the quantity of water being discharged by the pump 94 (i.e. the water level within the degasification container 1 begins to rise). When the water level within the degasification container 1 rises to a certain level, float switch or valve 17 will be concomitantly closed. As pump 94 continues to operate (as well as the circulating pump 5 disposed in the heating cycle continuing to operate), the large air bubbles disposed within the liquid medium being circulated are removed from the heating cycle within the degasification chamber 1, so that the liquid level within the degasification chamber 1 is at least periodically lowered again. When this liquid level drops below a certain predetermined limit the float valve 17 will again open, and additional fresh water will be supplied through the pipe 8 (the circulating pump 5 disposed in the heating cycle, i.e. conduit 2, is not illustrated in FIG. 8 for the sake of clarity). When the heating system is totally filled with liquid medium, the level within the degasification container 1 so levels off that the float valve 17 remains continuously closed. This completes the initial loading of the heating cycle or system according to the embodiment illustrated in FIG. 8.

The control 100 utilizes a different program for the subsequent continuous operation of the heating cycle. With this particular program, intake valve 20 is opened until a maximum liquid level is reached within the degasification container 1. Since the degasification container 1 is connected with the atmosphere, while the heating system or cycle itself is subjected to overpressure, a large portion of the gas contained within the liquid medium flowing into the degasification container 1 naturally escapes in the relatively low pressure environment disposed within the degasification container 1.

After a period of time (determined by the timer in the control unit 100), the pump 94 is turned on and exhausts the liquid from the degasification container 1 or forces the liquid against the heating system overpressure back into the system through discharge line 31 (in other words until such a time as the pressure within the heating system gauged by the pressure sensor 101 corresponds to a predetermined pressure), while the valve 22 is reopened (valve 22 is opened while the pump 94 is exhausting liquid medium from the degasification container 1 back into the heating system).

In the event that no liquid medium is present in the heating system, the pump 94 will continue to exhaust liquid from the container 1, even when the liquid level within the degasification container 1 has dropped below the point where the float valve 17 opens and fresh water is again introduced through the pipe 8. As soon as the designated system pressure as determined by presure sensor 101 has been reached, the pump 94 is turned off and the above described procedure is repeated again. It is naturally possible to frequently open and close valve 20 depending on the particular setting of the pressure sensor 101, or to proportionately regulate the operation of valve 20 while the pump 94 is operated almost continuously. However, this requires an unnecessarily long period of operation of the pump 94. On the other hand, during discontinued operation of the pump 94, the liquid medium contained within the degasification container 1 can be completely exhausted out therefrom prior to actuating the pump 94 into operation. The valve 22 can be formed as a simple non-return valve which automatically opens in the direction of the pump.

In the embodiment of the present invention illustrated in FIG. 7, the control unit 100, pump 94, pressure sensor 101, and remote-control valves are provided, as described with respect to the embodiment illustrated in FIG. 8. The embodiment of the present invention illustrated in FIG. 7, is preferably disposed in connection with a heating cycle as illustrated in FIG. 6, as is the embodiment illustrated in FIG. 8 too.

Two degasification containers 1a and 1b are provided in the embodiment illustrated in FIG. 7, with the first degasification container 1a connected with the circulating pipe 2 through the remotely-adjustable valve 20 and intake line 21. Additionally, the exhaust gas conduit 42 is preferably disposed at the highest point within the pressure container 1a, and can be closed by the remotely-adjustable valve 40. This exhaust gas conduit 42 extends into the second container 1b as illustrated in FIG. 7, container 1b being continuously connected to the atmosphere as illustrated. A discharge line 31, fitted with a discharge valve 19, is connected to the lowest point of the first degasification container 1a.

The discharge line 31 in the embodiment illustrated in FIG. 7 extends into the piping of the heating cycle or system, such as illustrated in FIG. 6. The second degasification container 1b, which is similar to the degasification container 1 illustrated in the embodiment of FIG. 8, is also equipped with a float-controlled fresh water feed pipe with appropriate valve 17, and with an overflow 9. The intake side of the pressure pump 94 is connected to the lowest point of the second degasification container 1b, while a manually-operated valve 32 is attached, preferably between the degasification container 1b and the pump 94. A second manually-activated valve 97 with a hose connection 96 is also attached at the intake side of the pressure pump 94 as illustrated. The pressure pump 94 is connected on its opposite side with the discharge line 31 through valve 22.

Additionally, pressure sensor 101 is fixed within the first degasification container 1a. The pressure sensor 101, valves 20 and 40, and pressure pump 94 are controlled by the control unit 100 through respective control lines 120, 140, and 194. As described above with respect to the embodiment of FIG. 8, the control 100 is equipped with several different program memories.

The operation of the embodiment illustrated in FIG. 7 will be described infra, in detail. During the initial loading of the heating system (the initial introduction of liquid medium thereinto), the respective valves 20, 22, 40, and 32 are opened, while the remaining valves (i.e. 19 and 97) are all closed. The pump 94 is then actuated. Since the level of the liquid medium or water disposed in the second degasification container 1b is low, the float valve 17 is naturally opened and fresh water flows into the second degasification container 1b from the pipe 8, where the liquid medium is forced by the pump 94 into the heating system. Before the liquid medium enters the system, air is exhausted through inlet pipe 21, the first degasification container 1a, and through the gas exhaust conduit 42, until the heating system is completely loaded. This occurs when the first degasification container 1a is completely full, and liquid medium flows over into the exhaust conduit 42, thus filling the second degasification container 1b, so that the float valve 17 closes.

The heating system then operates in this condition for a good deal of time, until large air bubbles disposed in the liquid medium cease to escape therefrom. If the system is to additionally be filled with brine (e.g., for solar heating), use is made of the hose 96 for introduction of brine into the system, with the valve 32 being closed and the valve 97 concomitantly opened. Thus the brine will be drawn into the heating system by the pressure pump 94.

During continuous operation of the system disclosed with respect to the embodiment in FIG. 7, the control unit 100 initially closes valves 40 and 22, and opens valves 19 and 20, so that due to the difference in pressure created by the circulating pump 5 disposed within the heating system (FIG. 6), the circulating liquid medium flows through the intake line 21 into the first degasification container 1a and returns into the heating system through the discharge line 31 and open valve 19. After a discrete period, it is certain that the degasification container 1a only contains liquid medium flowing therethrough having a relatively high proportion of dissolved gas therein. At this point, the control unit 100 closes the valves 19 and 20 and subsequently opens the valve 40. The first degasification container 1a is then put under atmospheric pressure through the valve 40 being opened in exhaust gas conduit 42 (i.e. atmospheric pressure is lower than the pressure within the heating system), so that the gases dissolved within the liquid medium in the degasification container 1a emerge from the liquid medium therein. A certain portion of the liquid medium naturally flows into the second degasification container 1b through the pipe 42.

After a certain period of time determined by the control unit 100, the valve 40 is closed again, and the valves 19 and 20 are opened so that the full pressure of the heating system is again admitted into the first degasification container 1a. At this particular juncture, the pressure sensor 101 gauges the system pressure, and the control unit 100, having been preprogrammed, compares the actual system pressure with a predetermined value. If the heating system pressure is below the predetermined value, this means that the water level or liquid medium level within the overall heating system is inadequate, whereupon the control unit 100 opens the valve 22 and starts the pressure pump 94 (during continuous operation, the valve 97 clearly remains closed with the valve 32 always remaining open). When the pump 94 starts, the liquid medium discharged through the pipe 42 during the previous degasification step, is once again returned to the heating cycle through the pump 94, open valve 22 and through the discharge conduit 31 as illustrated in FIG. 7. If there is still inadequate liquid medium within the heating system, the liquid medium will be supplemented by the float valve 17 opening and allowing fresh water or liquid to flow in through feed pipe 8.

In the previously-described procedure of operation of the embodiment of FIG. 7, the two-step action of the control 100 assures that the pressure pump 94 need only start when the second degasification container 1b, acting as a reservoir, is relatively full. In this situation, the pump 94 operates until the heating system pressure is re-established, in accordance with the predetermined value. This particular mode of operation thus requires an extremely low load of the pressure pump 94, while the overall degasification effect is still optimal. The embodiments of the present invention as illustrated in FIG. 7 and 8, which can be connected with heating systems in high-rise buildings for example, need not necessarily be equipped with a pressure pump 94 as illustrated therein.

The embodiments of the present invention as particularly illustrated in FIGS. 7 and 8, enable fully automatic operation of a heating cycle or system, even when, for instance, floor-heating systems with the above-noted difficulties are utilized, without making it necessary to manually deaerate or refill the heating system. These particular embodiments also ensure that heating systems can be easily filled with brine, and that during continuous deaeration, no liquid medium is lost due to the deaerating process. The valves 19 and 22 are preferably formed as non-return valves which automatically open in the direction of the respective arrows in FIGS. 7 and 8, to prevent any possible backflow of liquid medium up into the respective degasification chambers 1a and 1.

The above description of the present invention is merely exemplary, and is not intended to limit the scope thereof in any way.

What is claimed is:

1. Apparatus for degasifying a liquid medium comprising
   a chamber in which gas is removed from the liquid medium,
   means for conveying a liquid medium into said chamber, connected with an external source of the liquid medium, and constituting means for intermittently conveying the liquid medium from the external source to said chamber,
   means for conveying the liquid out of said chamber,
   means for reducing pressure within said chamber to separate the gas from the liquid medium, comprising a piston adapted to extend into and retract out of said chamber, to thereby alter volume of the same and constituting means for intermittently reducing pressure within said chamber to a level below pressure in the external source of the liquid medium, and
   means for directing the gas separated from the liquid medium out of said chamber, comprising an outlet connected with said chamber, in which
   said pressure reducing means additionally comprise means for flexibly sealing said piston from the volume of said chamber as said piston passes into and out of said chamber, thereby altering the volume thereof and
   means for driving said piston into and out of said chamber, said driving means comprising
   two adjacent pressure chamber,
   a second piston sealingly separating said adjacent pressure chambers from one another, said second piston connected with said first piston,
   a pressure line connected with each of said adjacent pressure chambers and adapted to introduce pressure fluid into each of said adjacent pressure chambers,
   valve means disposed in said pressure line to control introduction of pressure fluid into one or the other, or into both of said pressure chambers,
   two discharge lines, each connected with a respective adjacent pressure chamber for discharging pressure fluid therefrom, and
   valve means disposed in each of said discharge lines for controlling release of pressure fluid from said respective adjacent pressure chambers.

2. The apparatus of claim 1, in which
   the pressure fluid is a portion of circulating liquid medium,
   the pressure line is connected with the circulating liquid medium,
   the two discharge lines are connected with said means for conveying the liquid medium out of said chamber, said means comprising
   a discharge conduit connected with said chamber, and
   valve means disposed in said discharge conduit for controlling discharge of the liquid medium out of said chamber,
   and said apparatus additionally comprising
   pump means disposed in a path of the circulating liquid medium between said pressure line and said discharge conduit.

3. The apparatus of claim 2, in which said first and second pistons are integrally formed with said second piston disposed as an outer surface of said first piston, and said driving means additionally comprises a membrane sealingly separating said adjacent pressure chambers from one another.

4. Apparatus for degasifying a liquid medium, comprising a chamber in which gas is removed from the liquid medium, means for conveying a liquid medium into said chamber, connected with an external source of the liquid medium, and constituting means for intermittently conveying the liquid medium from the external source to said chamber, and comprising an inlet conduit connected with the external source, and valve means disposed in said inlet conduit for controlling introduction of the liquid medium into said chamber, means for conveying the liquid medium out of said chamber, comprising a discharge conduit and valve means disposed in said discharge conduit for opening and closing the same, means for reducing pressure within said chamber to separate the gas from the liquid medium, and constituting means for intermittently reducing pressure within said chamber to a level below pressure in the external source of the liquid medium, and comprising an outlet conduit connected with a top of said chamber, and valve means disposed in said gas outlet conduit for opening and closing the same, said gas outlet conduit and valve means also constituting means for directing the gas separated from the liquid medium out of said chamber, a second chamber, said gas outlet conduit opening into the same, an interior of said second chamber being continuously connected with the atmosphere, means for conveying liquid medium out of said second chamber, comprising a second discharge conduit engaged with said second chamber and with said first discharge conduit, valve means disposed in said second discharge conduit for opening and closing the same, and pump means displsed in said second discharge conduit for conveying liquid means from said second chamber into circulation.

5. The apparatus of claim 4, additionally comprising means for introducing liquid medium into said second chamber to initially introduce liquid medium to be circulated or to supplement liquid medium being circulated into and out of said first chamber, said introducing means comprising a feed conduit, and float-controlled valve means disposed within said feed conduit and adapted to open when the liquid medium in said second chamber is below a certain level.

6. The apparatus of claim 5, additionally comprising means for controlling operation of said pump means and all said valve means, comprising a central control device, a pressure sensor disposed in said first chamber to monitor pressure of the circulating medium and connected to said control device, and control lines, each respective line connecting said pump means or one of said valve means with said control device.

7. The apparatus of claim 5, in which said central control device is programmed to simultaneously open said valve means in said inlet and first discharge conduits and close said valve means in said gas outlet conduit from said first chamber, is also programmed to simultaneously close said valve means in said inlet and first discharge conduits and to open said valve means in said gas outlet conduit to reduce pressure in said first chamber, and is programmed to activate said pump means if pressure in the circulating liquid medium is below a predetermined value when said valve means in said gas outlet conduit is closed, and said valve means in said inlet and first discharge conduits are opened.

8. The apparatus of claim 4, additionally comprising heat exchange means, said means for conveying the liquid medium into and out of said chamber being connected with said heat exchange means.

9. The apparatus of claim 4, additionally comprising heat exchange means, said inlet and first discharge conduits being connected to said heat exchange means.

* * * * *